United States Patent
Sheng

(10) Patent No.: US 11,165,939 B2
(45) Date of Patent: Nov. 2, 2021

(54) PORTABLE IMAGE CAPTURING ELECTRONIC DEVICE AND IMAGE CAPTURING SYSTEM THEREWITH

(71) Applicant: AVISION INC., Hsinchu (TW)

(72) Inventor: Shao-Lan Sheng, Hsinchu (TW)

(73) Assignee: AVISION INC., Hsinchu (TW)

( * ) Notice: Subject to any disclaimer, the term of this patent is extended or adjusted under 35 U.S.C. 154(b) by 35 days.

(21) Appl. No.: 16/192,812

(22) Filed: Nov. 16, 2018

(65) Prior Publication Data

US 2019/0204715 A1    Jul. 4, 2019

(30) Foreign Application Priority Data

Jan. 3, 2018 (TW) .................. 107100160

(51) Int. Cl.
*H04N 5/225* (2006.01)
*G03B 15/06* (2021.01)
*G03B 17/56* (2021.01)
*G03B 11/04* (2021.01)
*H01H 13/02* (2006.01)
*G03B 15/03* (2021.01)

(52) U.S. Cl.
CPC ........... *H04N 5/2254* (2013.01); *G03B 11/04* (2013.01); *G03B 11/045* (2013.01); *G03B 15/03* (2013.01); *G03B 15/06* (2013.01); *G03B 17/563* (2013.01); *H01H 13/023* (2013.01); *H04N 5/2252* (2013.01); *H04N 5/2256* (2013.01); *H04N 2201/0456* (2013.01)

(58) Field of Classification Search
None
See application file for complete search history.

(56) References Cited

U.S. PATENT DOCUMENTS

| 4,488,679 A | * | 12/1984 | Bockholt | ................. G06K 7/12 |
| | | | | 235/462.04 |
| 5,313,373 A | * | 5/1994 | Bjorner | ..................... B07C 3/14 |
| | | | | 362/17 |
| 5,585,616 A | * | 12/1996 | Roxby | ............... G06K 7/10722 |
| | | | | 235/454 |

(Continued)

FOREIGN PATENT DOCUMENTS

| CN | 1533144 A | 9/2004 |
| CN | 2724044 Y | 9/2005 |

(Continued)

*Primary Examiner* — Quan Pham
(74) *Attorney, Agent, or Firm* — Winston Hsu

(57) ABSTRACT

A portable image capturing electronic device includes a main body, an image capturing lens assembly and a light source assembly. An accommodating chamber is disposed inside the main body. The accommodating chamber includes a top portion and a bottom portion disposed opposite to each other. The image capturing lens assembly is disposed on the top portion and faces toward the bottom portion to capture an image corresponding to an object disposed at the bottom portion. The light source assembly includes a plurality of first light sources. The light source assembly is disposed on the top portion, and the plurality of first light sources face toward the bottom portion to provide illumination for the object and are disposed nearby the image capturing lens assembly. The present application facilitates illumination control when capturing the image, which can effectively reduce errors in image processing.

19 Claims, 8 Drawing Sheets

(56) References Cited

U.S. PATENT DOCUMENTS

| | | | | |
|---|---|---|---|---|
| 6,052,534 A | * | 4/2000 | Goto | G03B 27/323 |
| | | | | 396/544 |
| 6,595,422 B1 | * | 7/2003 | Doljack | G06K 7/10722 |
| | | | | 235/462.42 |
| 7,419,098 B2 | * | 9/2008 | Hyde | G06K 7/10792 |
| | | | | 235/462.37 |
| 8,998,090 B1 | * | 4/2015 | Flugge | G02B 6/0096 |
| | | | | 235/454 |
| 9,070,031 B2 | * | 6/2015 | Nunnink | G06K 7/10732 |
| 9,826,152 B1 | | 11/2017 | Martin | |
| 2001/0027999 A1 | * | 10/2001 | Lee | G06K 7/10811 |
| | | | | 235/462.45 |
| 2002/0117547 A1 | * | 8/2002 | Krichever | G06K 7/10811 |
| | | | | 235/462.01 |
| 2004/0179135 A1 | * | 9/2004 | Battles | H04N 1/00127 |
| | | | | 348/373 |
| 2006/0251408 A1 | * | 11/2006 | Konno | A61B 5/4547 |
| | | | | 396/14 |
| 2008/0232115 A1 | * | 9/2008 | Tsai | F21S 9/03 |
| | | | | 362/362 |
| 2013/0083556 A1 | * | 4/2013 | Huang | H01H 13/023 |
| | | | | 362/602 |
| 2014/0307160 A1 | | 10/2014 | Wheeler | |
| 2016/0050348 A1 | * | 2/2016 | Gibbons | H04N 1/04 |
| | | | | 348/311 |

FOREIGN PATENT DOCUMENTS

| | | |
|---|---|---|
| CN | 2847736 Y | 12/2006 |
| CN | 201204646 Y | 3/2009 |
| CN | 103776998 A | 5/2014 |
| CN | 105681969 A | 6/2016 |
| CN | 106331461 A | 1/2017 |
| TW | M244482 | 9/2004 |

* cited by examiner

PORTABLE IMAGE CAPTURING ELECTRONIC DEVICE AND IMAGE CAPTURING SYSTEM THEREWITH

BACKGROUND OF THE INVENTION

1. Field of the Invention

The invention relates to a portable image capturing electronic device and an image capturing system therewith, and more particularly, to a portable image capturing electronic device capable of conveniently controlling light intensity of light sources for illumination and an image capturing system therewith.

2. Description of the Prior Art

In today's workplace we deal with a variety of documents, such as bills from banks, policy documents from insurance companies, payment bills from firms, receipts and invoices from logistics businesses, etc. Whatever the text length contained in the documents might be, all the documents are crucial to corporations. For the convenience of future review, statistical analysis, and audit, corporations often need large amount of manpower to collate typewriting and to sort the document information systematically, which is not only time-consuming but also prone to mistakes due to human errors.

To solve the aforementioned problems, image capturing technologies implemented with feature identification techniques, such as character recognition or pattern recognition, can be provided for acquiring the document information and sorting the information systematically. Conventionally, mobile phones implemented with particular application software are utilized to photograph the documents and systematically sort the captured information of the documents, and this approach of applying the devices to the objects really facilitates image information acquisition. However, it is time-consuming for users to locate the object to be shot with mobile phones and is also time-consuming for zooming lenses of mobile phones to focus on the object before snapping. Besides, being in dim light and without photoflash or night-mode function, images captured by the mobile phones might fail to be recognized due to underexposure. If the light intensity of the light source is excessive, images captured by the mobile phones might fail to be recognized due to overexposure or sharp light reflection. Therefore, the aforementioned problems cause the users to waste time in locating the object, focusing, and adjusting the light intensity, and the captured images are often with undesirable poor definition.

Mature image capturing platform technologies, such as the data reader device disclosed by Taiwan patent TWD132134 or the multi-purpose scanner disclosed by US patent US20150256704, are often implemented with function of image analysis to acquire image data. However, when capturing images with these image capturing devices, users need to put the object on the platform (i.e. by applying the object to the device), which is quite impractical if the users want to capture images of a bill on a package or images of printed data attached to a large-sized machine.

In summary, it is desirable to develop a product that is suitable for different industries and for various types of documents on objects with various sizes so as to facilitate users inefficiently sorting out accurate and systematic electronic information.

SUMMARY OF THE INVENTION

Therefore, the objective of the present application is to provide a portable image capturing electronic device capable of controlling light intensity of light sources for illumination and an image capturing system therewith so as to solve the aforementioned problems.

To achieve the abovementioned objective, the present application provides the portable image capturing electronic device which includes a main body, an image capturing lens assembly, and a light source assembly. An accommodating chamber is formed inside the main body. The accommodating chamber includes a top portion and a bottom portion opposite to the top portion. The image capturing lens assembly is disposed on the top portion and faces toward the bottom portion for capturing an image corresponding to an object. The light source assembly is disposed on the top portion and includes a plurality of first light sources. The plurality of first light sources are disposed at positions adjacent to the image capturing lens assembly and face toward the bottom portion for illuminating the object.

To achieve the abovementioned objective, the present application further provides an image capturing system which includes an electronic apparatus and a portable image capturing electronic device. The electronic apparatus includes a processing unit, a data storage section, and a second signal transmitting component. The processing unit is for processing data of an image. The data storage section is electrically connected to the processing unit and is for storing the data of the image processed by the processing unit. The second signal transmitting component is electrically connected to the processing unit and is for receiving the image. The portable image capturing electronic device includes a main body, an image capturing lens assembly, a light source assembly, a handheld assembly, and a first signal transmitting component. An accommodating chamber is formed inside the main body. The accommodating chamber includes a top portion and a bottom portion opposite to the top portion. The image capturing lens assembly is disposed on the top portion and faces toward the bottom portion for capturing an image corresponding to an object. The light source assembly is disposed on the top portion and includes a plurality of first light sources. The plurality of first light sources are disposed at positions adjacent to the image capturing lens assembly and face toward the bottom portion for illuminating the object. The handheld assembly includes a handle portion and an actuating button adjacent to the handle portion. The first signal transmitting component is electrically connected to the actuating button and the image capturing lens assembly and is for communicating with the second signal transmitting component so as to transmit the image. When the actuating button generates a first signal and transmits the first signal to the processing unit via the communication between the first signal transmitting component and the second signal transmitting component, the processing unit emits a corresponding second signal to activate, via the communication between the first signal transmitting component and the second signal transmitting component, the image capturing lens assembly for capturing the image corresponding to the object and transmitting the image to the processing unit for the analysis.

In summary, the present application utilizes the main body of the portable image capturing electronic device to gather light from the light sources and keep the light inside the main body so that the object at the bottom portion is adequately illuminated. Since the environment of illumination provided inside the main body is isolated and stable, when the present application is applied to capture images of multiple packages, the illumination light intensity can be adjusted to achieve a preferred exposure level in accordance with the first package, and thereby parameters relating to the preferred exposure level can be kept or fine-tuned for capturing images of the rest packages, which saves time greatly. Besides, the handle portion and the actuating button disposed on the main body facilitate a user to control the portable image capturing electronic device with one hand. If the means for data processing are transplanted to an external electronic apparatus, such as a computer or a server, components used in the portable image capturing electronic device can be further reduced to achieve weight reduction, which not only alleviates burden on the user's the wrist handling the portable image capturing electronic device but also optimizes calculation speed of the external electronic apparatus where the captured images are transmitted and stored. Therefore, the present application not only effectively reduces the manpower and time required to backup paper documents to the electronic system but also achieves the purpose of sorting the imported data systematically.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure (s) being described. The components of the present invention can be positioned in a number of different orientations. As such, the directional terminology is used for purposes of illustration and is in no way limiting. Accordingly, the drawings and descriptions will be regarded as illustrative in nature and not as restrictive.

Figure 1:
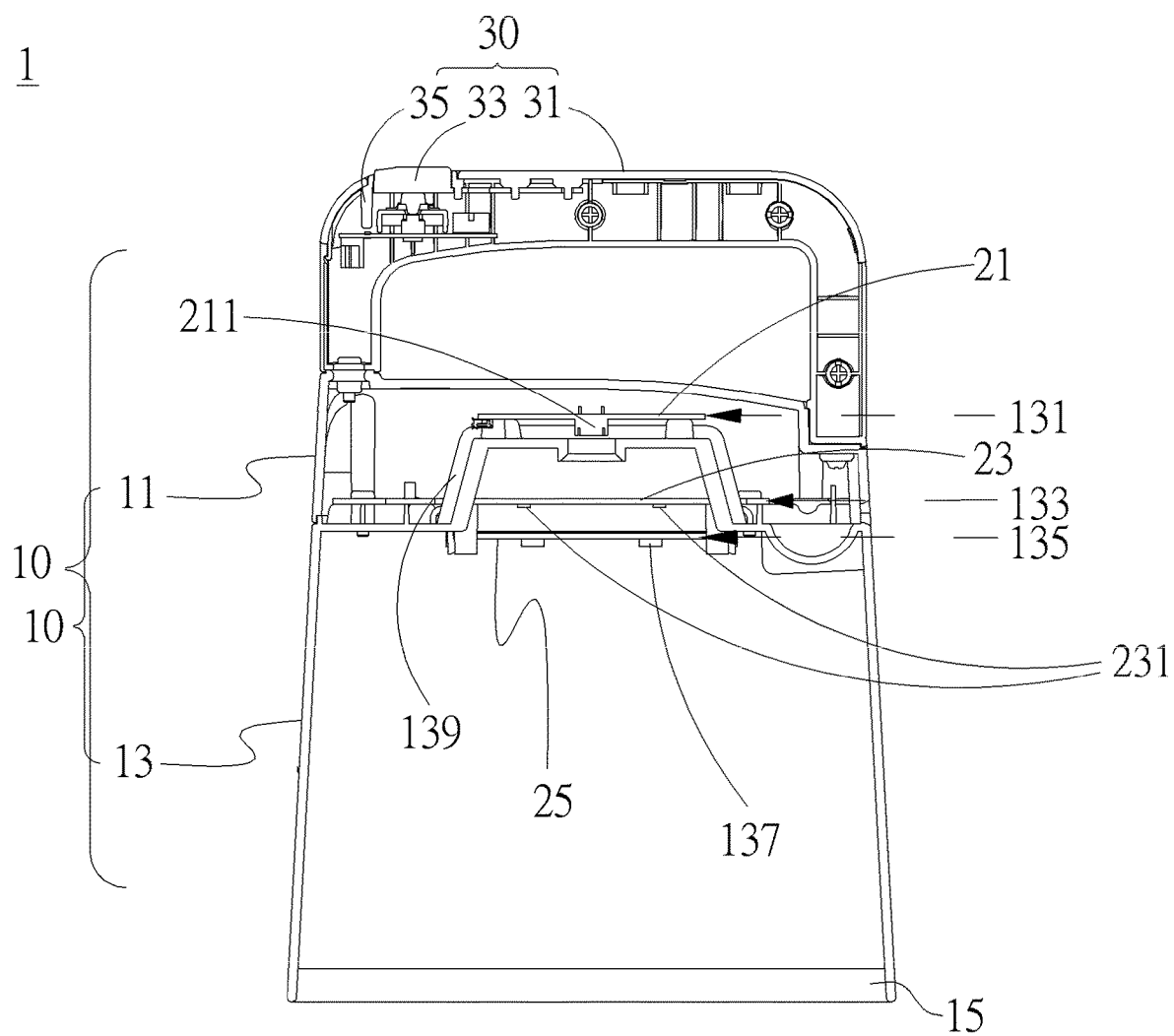
FIG. 1 is a sectional diagram of a portable image capturing electronic device according to an embodiment of the present application.
Figure 1A:
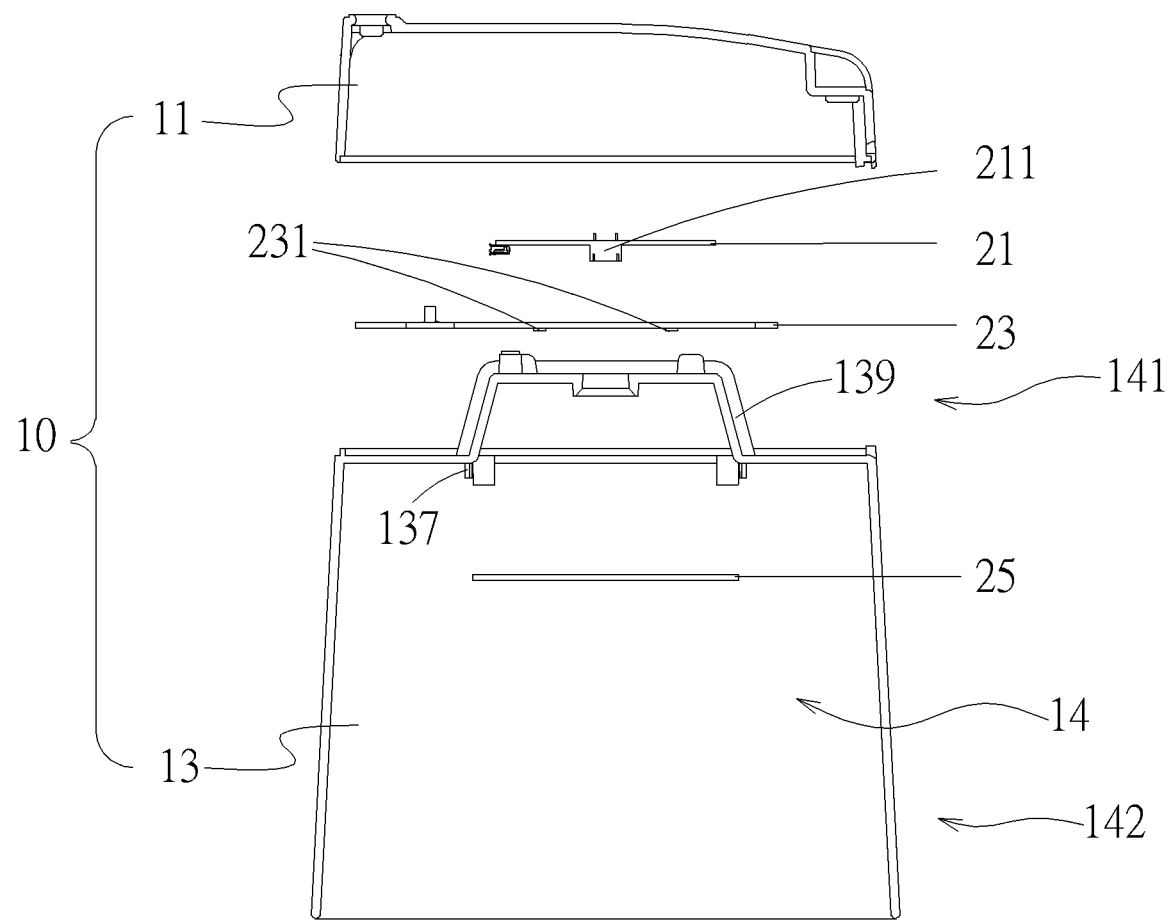
FIG. 1A is an exploded diagram of a main body of the portable image capturing electronic device according to the embodiment of the present application.
Figure 1B:
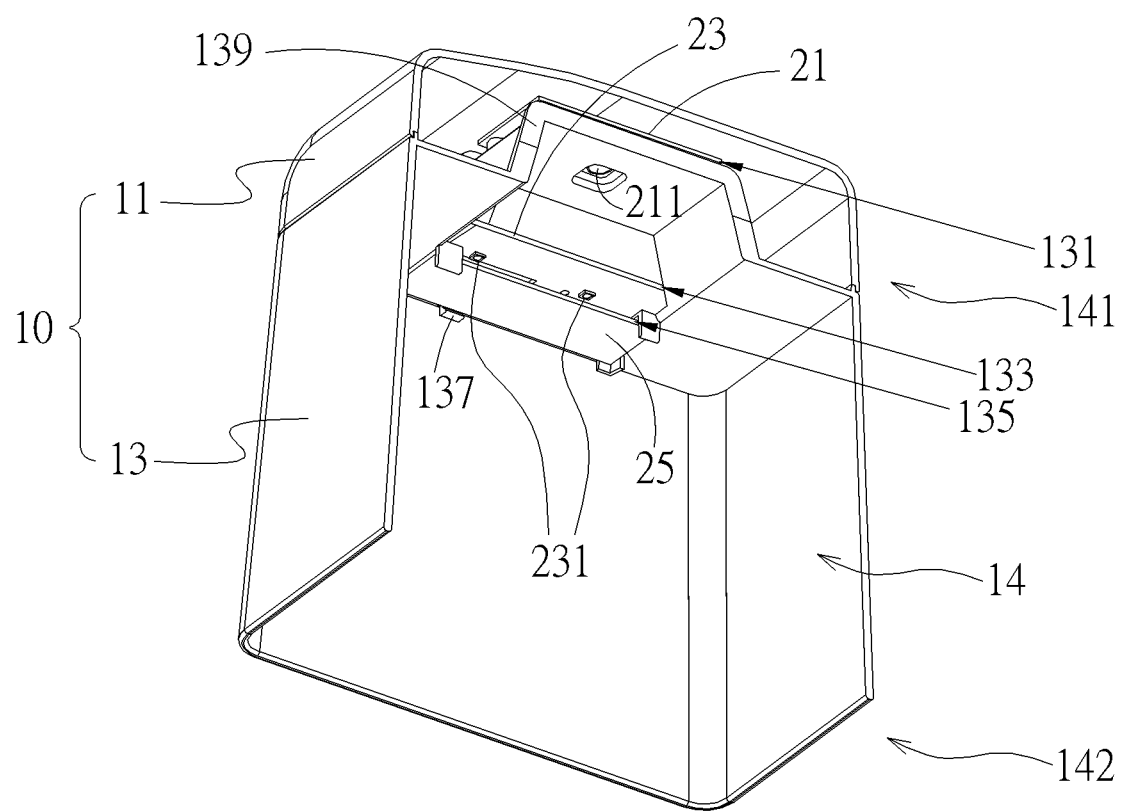
FIG. 1B is a diagram illustrating a partial internal structure of the portable image capturing electronic device according to the embodiment of the present application.
Figure 1C:
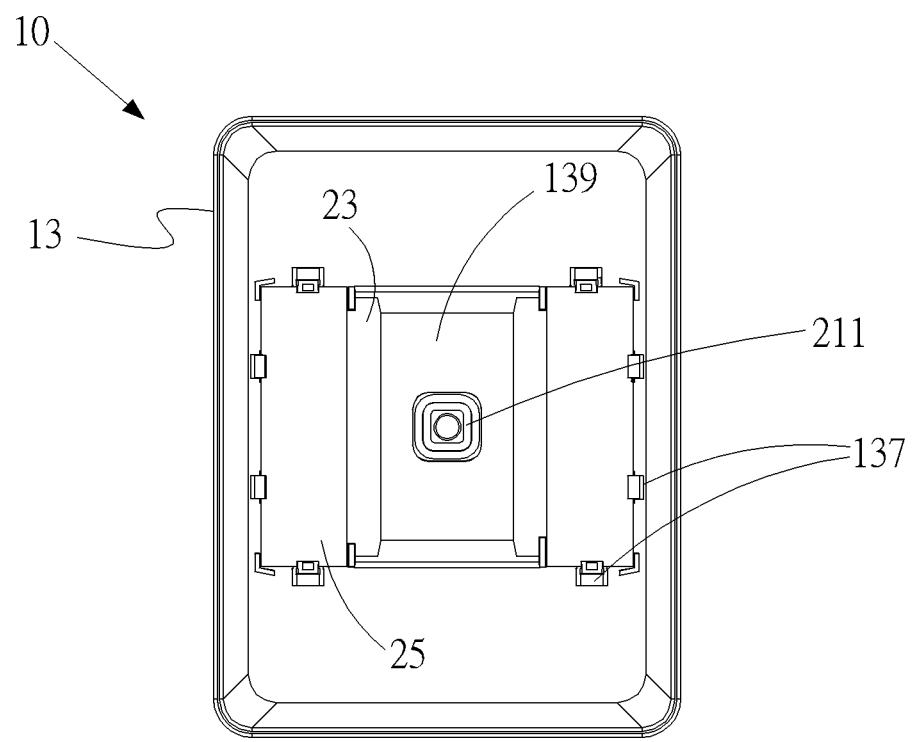
FIG. 1C is a bottom view of the main body of the portable image capturing electronic device according to the embodiment of the present application.

Please refer to FIG. 1, FIG. 1A, FIG. 1B, and FIG. 1C. FIG. 1 is a sectional diagram of a portable image capturing electronic device 1 according to an embodiment of the present application. FIG. 1A is an exploded diagram of a main body 10 of the portable image capturing electronic device 1 according to the embodiment of the present application. FIG. 1B is a diagram illustrating a partial internal structure of the portable image capturing electronic device 1 according to the embodiment of the present application. FIG. 1C is a bottom view of the main body 10 of the portable image capturing electronic device 1 according to the embodiment of the present application. As shown in FIG. 1, FIG. 1A, FIG. 1B, and FIG. 1C, the portable image capturing electronic device 1 includes the main body 10, an image capturing lens assembly 21, a light source assembly 23, and a handheld assembly 30. An accommodating chamber 14 is formed inside the main body 10. The accommodating chamber 14 includes a top portion 141 and a bottom portion 142 opposite to the top portion 141. The image capturing lens assembly 21 is disposed on the top portion 141 and faces toward the bottom portion 142 for capturing an image corresponding to an object (not shown in figures). The light source assembly 23 is disposed on the top portion 141 and includes a plurality of first light sources 231. The plurality of first light sources 231 are disposed adjacent to the image capturing lens assembly 21 and face toward the bottom portion 142 for illuminating the object so that the image captured by the image capturing lens assembly 21 has a preferred exposure level and a preferred definition. The structural design that the plurality of first light sources 231 and the image capturing lens assembly 21 are disposed at the same side of the accommodating chamber 14 facilitates control and stability of light intensity during the image capturing procedure so that errors in image analysis are reduced and accuracy is enhanced.

The main body 10 includes a connecting portion 11 and a shading portion 13 disposed adjacent to the connecting portion 11. The connecting portion 11 is for connecting the shading portion 13 and the handheld assembly 30. The shading portion 13 and the bottom of the main body 10 form an enclosed space. The object can be paced at the bottom of the main body 10 when the portable image capturing electronic device 1 is used to capture the image corresponding to the object so that the light from the plurality of first light sources 231 can be gathered inside the enclosed space other than being scattered away. Therefore, the captured image is presented accurately and with great definition without consuming too much power for increasing the light intensity. Besides, there is no need to develop software applications with complicated scene modes for compensating image capturing defects. The connecting portion 11 can be mounted adjacently to the shading portion 13, and the top portion 141 of the accommodating chamber 14 is located at a position where the connecting portion 11 is adjacent to the shading portion 13 in this embodiment. In another embodiment, the connecting portion 11 can be integrated to the shading portion 13, but not limited to this.

The main body 10 can further include a light diffusing plate 25 disposed at a third position 135 under the plurality of first light sources 231. The light diffusing plate 25 uniforms the light intensity of the plurality of first light sources 231 so that the object at the bottom is illuminated uniformly. The shading portion 13 can include at least one hook structure 137 for fixing the light diffusing plate 25 at a position opposite to the plurality of first light sources 231. That is, the light diffusing plate 25 is positioned between the plurality of first light sources 231 and the bottom portion 142. Besides, as shown in FIG. 1, a light transmissive base plate 15 can be disposed near the bottom of the main body 10 so as to press against the object flatly for capturing an image corresponding to the object with fine flatness and smoothness.

Please refer to FIG. 1B. The image capturing lens assembly 21 is disposed at a first position 131 of the top portion 141. The plurality of first light sources 231 of the light source assembly 23 are disposed at a second position 133 of the top portion 141, and the first position 131 and the second position 133 are substantially at different horizontal levels. Specifically, the shading portion 13 can further include a protrusion portion 139 where the image capturing lens assembly 21 is disposed (i.e. the first position 131 where the image capturing lens assembly 21 is located is on the protrusion portion 139). Therefore, a distance between the image capturing lens assembly 21 and the bottom portion 142 is larger than a distance between the plurality of first light sources 231 and the bottom portion 142. In another embodiment, the first position 131 and the second position 133 can be substantially at an equal horizontal level, that is, the distance between the image capturing lens assembly 21 and the bottom portion 142 is substantially equal to the distance between the plurality of first light sources 231 and the bottom portion 142.

Please refer to FIG. 1C. The image capturing lens assembly 21, the plurality of first light sources 231 of the light source assembly 23 and the light diffusing plate 25 are respectively disposed at the first position 131, the second position 133, and the third position 135 so that a camera 211 of the image capturing lens assembly 21 is not obstructed by the plurality of first light sources 231 of the light source assembly 23 and the light diffusing plate 25. That is, the first light sources 231 and the light diffusing plate 25 do not intervene between the image capturing lens assembly 21 and the bottom portion 142. Since the diffusing plate 25 is for uniforming the light intensity of the plurality of first light sources 231 within the shading portion 13, the third position 135 where the light diffusing plate 25 is positioned is between the plurality of first light sources 231 and the bottom portion 142.

Figure 2A:
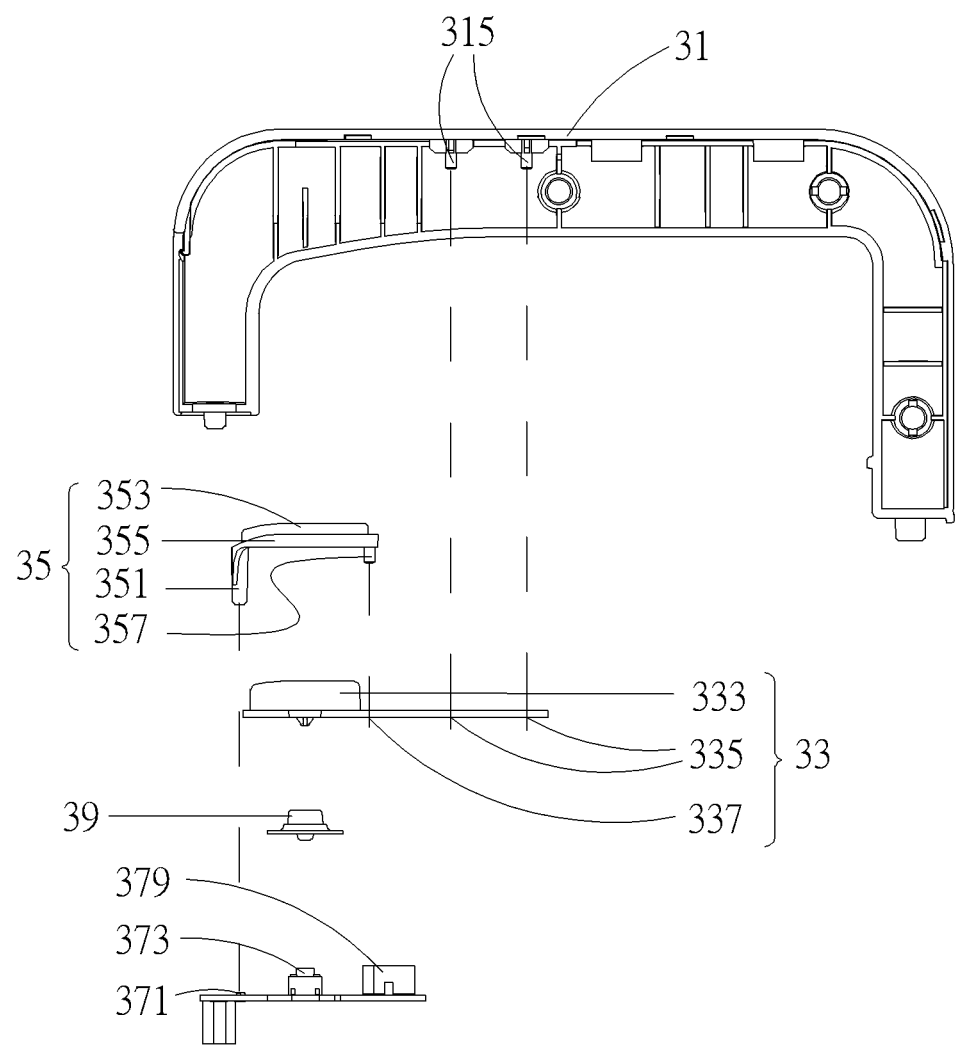
FIG. 2A is an exploded diagram of a handheld assembly of the portable image capturing electronic device according to the embodiment of the present application.
Figure 2B:
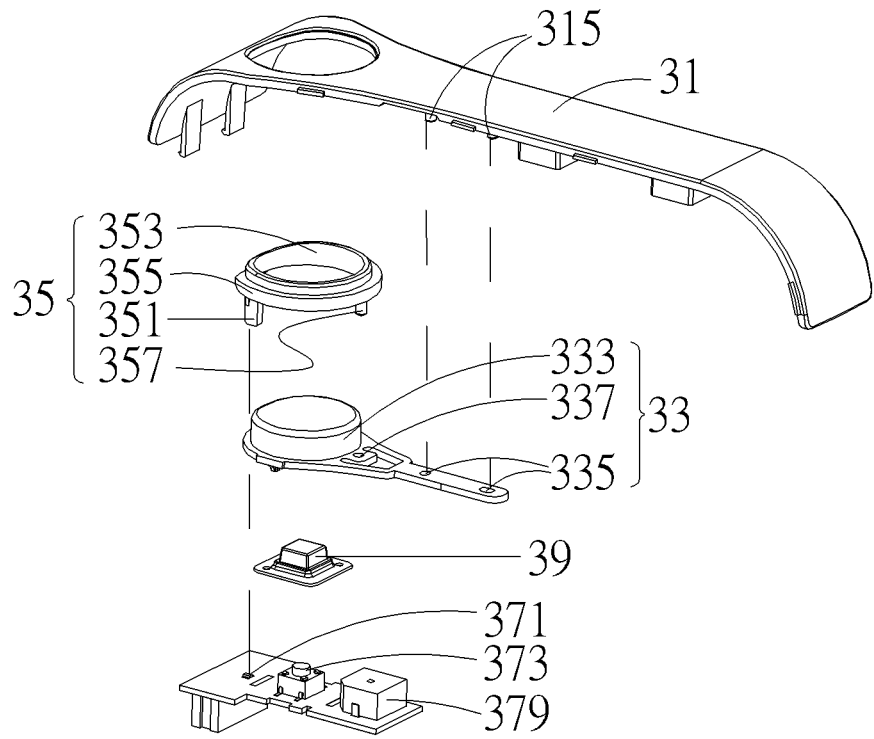
FIG. 2B is an another exploded diagram at another view of the handheld assembly of the portable image capturing electronic device according to the embodiment of the present application.
Figure 2B:
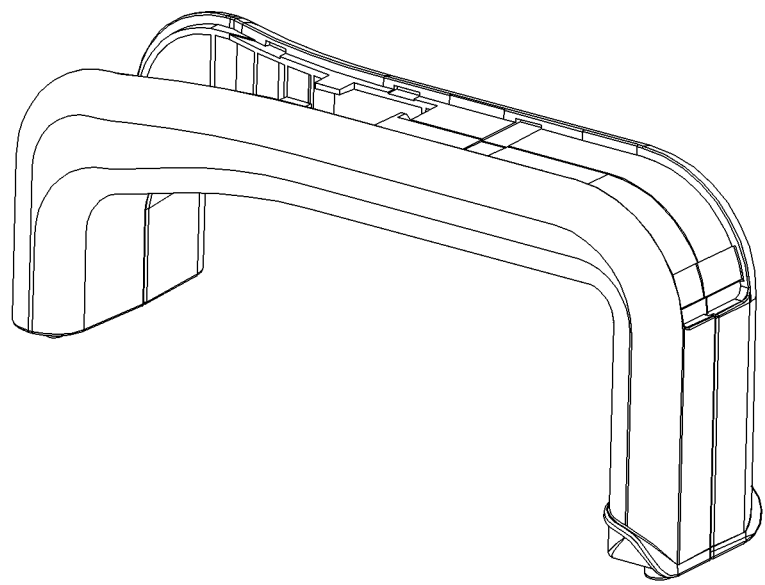

Please refer to FIG. 1, FIG. 2A, and FIG. 2B. FIG. 2A is an exploded diagram of the handheld assembly 30 of the portable image capturing electronic device 1 according to the embodiment of the present application. FIG. 2B is an another exploded diagram at another view of the handheld assembly 30 of the portable image capturing electronic device 1 according to the embodiment of the present application. As shown in FIG. 1, FIG. 2A, and FIG. 2B, the handheld assembly 30 includes a handle portion 31, an actuating button 33 and an indicating component 35. The actuating button 33 is adjacent to the handle portion 31. The actuating button 33 can be disposed on a rim of the handle portion 31 for convenient operation with one hand. The indicating component 35 is adjacent to the actuating button 33, and the actuating button 33 is for actuating the camera 221 of the image capturing lens assembly 21 to capture images. The handheld assembly 30 can further include a second light source 371, a signal emitter 373, and a warning component 379. The signal emitter 373 is controlled by the actuating button 33 to emit a signal. The warning component 379 is electrically connected to the signal emitter 373 so that the warning component 379 can be simultaneously actuated to generate a warning signal as the signal emitter 373 emits the signal. The warning signal informs a user that the signal has been emitted by the signal emitter 373, and the warning signal can be a sound signal or a vibration signal. In other embodiments, the warning component 379 can generate the warning signal as the image capturing process starts, as the image capturing process finishes, or at other time points.

The indicating component 35 of the handheld assembly 30 includes a light guide post 351, an indicating portion 353, a restraining portion 355, and a first positioning post 357. The light guide post 351 is for guiding light from the second light source 371 to the indicating portion 353. The first positioning post 357 is adjacent to the restraining portion 355. The restraining portion 355 is disposed between a housing of the handheld assembly 30 and the actuating button 33. The actuating button 33 includes a first positioning hole 337, at least one second positioning hole 335, and a button portion 333. The first positioning hole 337 is located in a position corresponding to the first positioning post 357 and for engaging with the first positioning post 357. A second positioning post 315 is disposed on the inside of the housing of the handheld assembly 30, and the second positioning hole 335 is located in a position corresponding to the second positioning post 315 and for engaging with the second positioning post 315. The button portion 333 penetrates through the indicating component 35 and the housing of the handheld assembly 30 so as to be exposed outside of the housing. By the aforementioned structural design, the handle portion 31, the actuating button 33, and the indicating component 35 are assembled together.

The handheld assembly 30 can further comprise a buffering component 39 which is disposed between the actuating button 33 and the signal emitter 373. The buffering component 39 can be made of rubber, foam, sponge, springs, or other elastic material. The buffering component 39 buffers a force exerted on the actuating button 33 being pressed by a user, and thereby the service life of the actuating button 33 is expanded.

Figure 3:
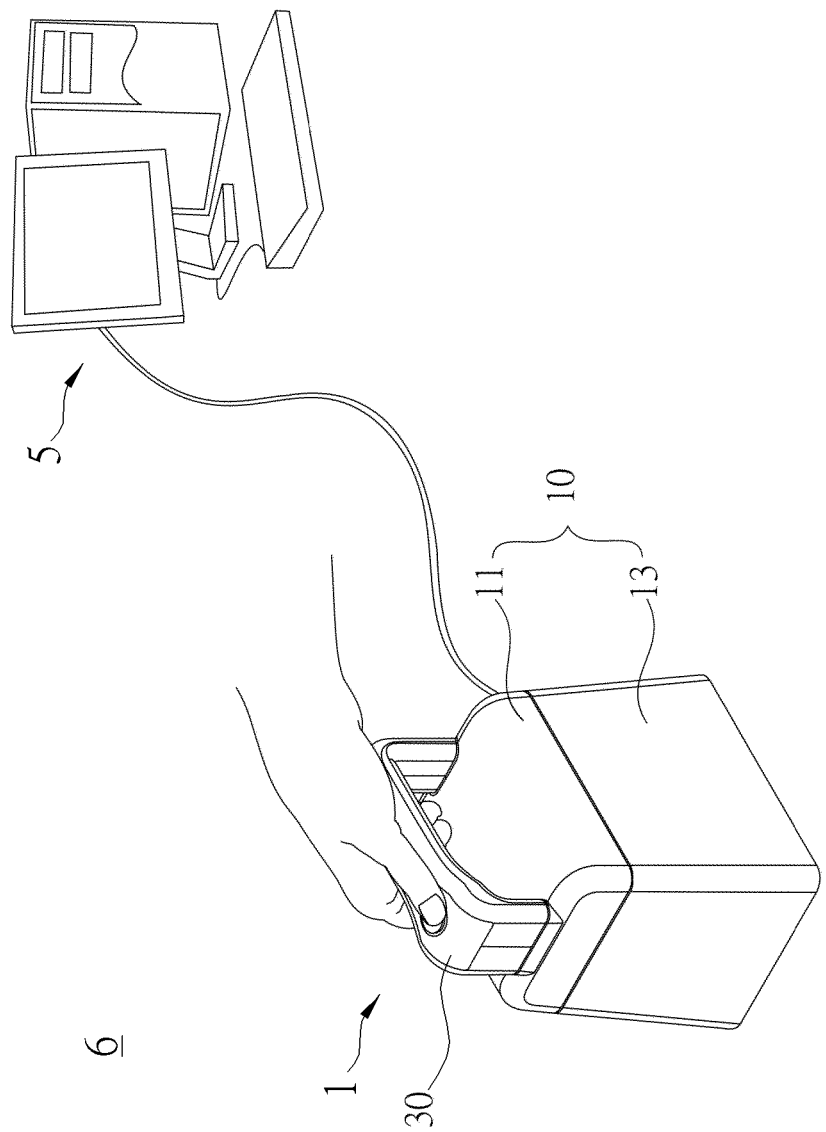
FIG. 3 is a diagram of an image capturing system according to the embodiment of the present application.
Figure 4:
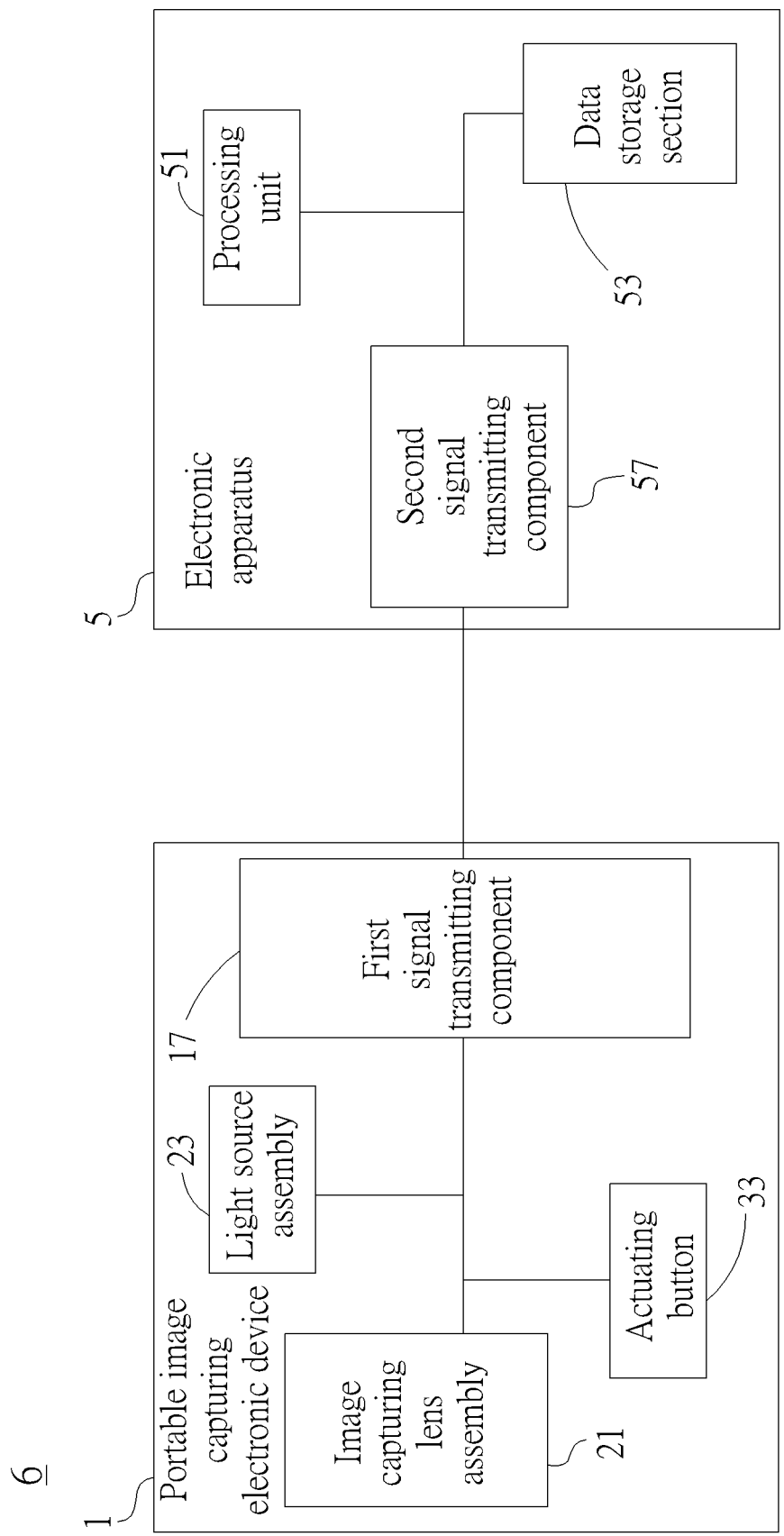
FIG. 4 is a functional block diagram of the image capturing system according to the embodiment of the present application.

Please refer to FIG. 3 and FIG. 4. FIG. 3 is a diagram of an image capturing system 6 according to the embodiment of the present application. FIG. 4 is a functional block diagram of the image capturing system 6 according to the embodiment of the present application. As shown in FIG. 3 and FIG. 4, the image capturing system 6 includes an electronic apparatus 5 and the portable image capturing electronic device 1. The electronic apparatus 5 includes a processing unit 51, a data storage section 53, and a second signal transmitting component 57. The processing unit 51 is for processing data of an image transmitted from the portable image capturing electronic device 1. The data storage section 53 is electrically connected to the processing unit 51 and is for storing the data of the image processed by the processing unit 51. The second signal transmitting component 57 is electrically connected to the processing unit 51 and for receiving the image from the portable image capturing electronic device 1. The portable image capturing electronic device 1 further includes a first signal transmitting component 17 electrically connected to the actuating button 33, the image capturing lens assembly 21, and the light source assembly 23. The first signal transmitting component 17 communicates with the second signal transmitting component 57 so as to transmit the image to the electronic apparatus 5. The first signal transmitting component 17 and the second signal transmitting component 57 can be communicated by wire connection or wireless connection to build a channel for signal transmission. When the actuating button 33 generates a first signal and transmits the first signal to the processing unit 51 via communication between the first signal transmitting component 17 and the second signal transmitting component 57, the processing unit 51 generates a corresponding second signal to actuate the image capturing lens assembly 21 to capture the image corresponding to the object and then the captured image is transmitted to the processing unit 51 via the communication between the first signal transmitting component 17 and the second signal transmitting component 57.

Besides, the plurality of first light sources 231 can be actuated when the portable image capturing electronic device 1 and the electronic apparatus 5 are coupled through the first signal transmitting component 17 and the second signal transmitting component 57, and thereby the plurality of first light sources 231 can provide the illumination during the image capturing process. The second light source 371 presents a first color, such as a green color, when the portable image capturing electronic device 1 and the electronic apparatus 5 are coupled through the first signal transmitting component 17 and the second signal transmitting component 57. The second light source 371 presents a second color different from the first color, such as a red color, when the portable image capturing electronic device 1 and the electronic apparatus 5 are not coupled. Therefore, the user can be informed that the portable image capturing electronic device 1 is ready for image capturing as the portable image capturing electronic device 1 and the electronic apparatus 5 are coupled when the user observes the first color of the second light source 371. In another embodiment, whether the portable image capturing electronic device 1 is coupled with the electronic apparatus 5 can be judged by the glittering frequency or the light intensity of the second light source 371, and it depends on actual design demands.

In contrast to the prior art, the present application utilizes the main body of the portable image capturing electronic device to gather light from the light sources and keep the light inside the main body so that the object at the bottom portion is adequately illuminated. Since the environment of illumination provided inside the main body is isolated and stable, when the present application is applied to capture images of multiple packages, the illumination light intensity can be adjusted to achieve a preferred exposure level in accordance with the first package, and thereby parameters relating to the preferred exposure level can be kept or fine-tuned for capturing images of the rest packages, which saves time greatly. Besides, the handle portion and the actuating button disposed on the main body facilitate a user to control the portable image capturing electronic device with one hand. If the means for data processing are transplanted to an external electronic apparatus, such as a computer or a server, components used in the portable image capturing electronic device can be further reduced to achieve weight reduction, which not only alleviates burden on the user's the wrist handling the portable image capturing electronic device but also optimizes calculation speed of the external electronic apparatus where the captured images are transmitted and stored. Therefore, the present application not only effectively reduces the manpower and time required to backup paper documents to the electronic system but also achieves the purpose of sorting the imported data systematically.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A portable image capturing electronic device, comprising:
    a main body, an accommodating chamber being formed inside the main body and comprising a top portion and a bottom portion opposite to the top portion, the main body comprising a shading portion and a connecting portion, the shading portion comprising a protrusion portion, the protrusion portion protruding toward the connecting portion and away from the bottom portion of the accommodating chamber, the protruding portion comprising four lateral walls and a top wall, the four lateral walls being inclined relative to the top wall and connected to the top wall, a bottom opening being enclosed by the four lateral walls, a size of the top wall being less than a size of the bottom opening, the top wall and the four lateral walls of the protrusion portion being located inside the connecting portion, and the connecting portion being formed in a one piece structure;
    a handheld assembly connected to the connecting portion;
    a light transmissive base plate disposed near a bottom of the main body and for pressing against an object;
    an image capturing lens assembly disposed on the top wall of the protrusion portion and located at the top portion and facing toward the bottom portion for capturing an image corresponding to the object pressed by the light transmissive base plate; and
    a light source assembly disposed on the top portion and comprising a plurality of first light sources, the plurality of first light sources being disposed adjacent to the image capturing lens assembly and facing toward the bottom portion for illuminating the object, and the plurality of first light sources being located inside the protruding portion and between the top wall and the bottom opening.

2. The portable image capturing electronic device of claim 1, wherein the connecting portion is disposed adjacent to the shading portion or integrated with the shading portion.

3. The portable image capturing electronic device of claim 2, wherein the top portion of the accommodating chamber is located at a position where the connecting portion is adjacent to the shading portion.

4. The portable image capturing electronic device of claim 2, wherein the main body further comprises a light diffusing plate disposed under the plurality of first light sources and between the plurality of first light sources and the bottom portion and without intervening between the image capturing lens assembly and the bottom portion, and the light diffusing plate uniforms light intensity of the plurality of first light sources.

5. The portable image capturing electronic device of claim 4, wherein the shading portion further comprises a plurality of hook structures for fixing the light diffusing plate.

6. The portable image capturing electronic device of claim 4, wherein the image capturing lens assembly is disposed at a first position of the top portion, the plurality of first light sources are disposed at a second position of the top portion, the light diffusing plate is disposed at a third position under the plurality of first light sources, the first position and the second position are substantially at an equal horizontal level, and the third position and the second position are substantially at different horizontal levels.

7. The portable image capturing electronic device of claim 6, wherein a distance between the image capturing lens assembly and the bottom portion is substantially equal to a distance between the plurality of first light sources and the bottom portion.

8. The portable image capturing electronic device of claim 4, wherein the image capturing lens assembly is disposed at a first position of the top portion, the plurality of first light sources are disposed at a second position of the top portion, the light diffusing plate is disposed at a third position under the plurality of first light sources, the first position and the second position are substantially at different horizontal levels, and the third position and the second position are substantially at different horizontal levels.

9. The portable image capturing electronic device of claim 8, wherein the first position is located on the protrusion portion.

10. The portable image capturing electronic device of claim 8, wherein a distance between the image capturing lens assembly and the bottom portion is larger than a distance between the plurality of first light sources and the bottom portion.

11. The portable image capturing electronic device of claim 1, wherein the handheld assembly comprises a handle portion and an actuating button for actuating the image capturing lens assembly to capture the image corresponding to the object.

12. The portable image capturing electronic device of claim 11, wherein the handheld assembly further comprises an indicating component adjacent to the actuating button, and the actuating button is adjacent to the handle portion.

13. The portable image capturing electronic device of claim 12, wherein the handheld assembly further comprises a signal emitter controlled by the actuating button to emit a signal.

14. The portable image capturing electronic device of claim 13, wherein the handheld assembly further comprises a warning component electrically connected to the signal emitter and for generating a warning signal as the signal emitter emits the signal.

15. The portable image capturing electronic device of claim 12, wherein the indicating component comprises:
an indicating portion;
a restraining portion disposed between a housing of the handheld assembly and the actuating button;
a first positioning post adjacent to the restraining portion; and
a light guide post for guiding light from a second light source to the indicating portion.

16. The portable image capturing electronic device of claim 15, wherein the actuating button comprises a first positioning hole corresponding to the first positioning post, a second positioning hole corresponding to a second positioning post of the housing of the handheld assembly, and a button portion penetrating through the indicating component and the housing of the handheld assembly so as to be exposed outside of the housing.

17. An image capturing system, comprising:
an electronic apparatus comprising:
a processing unit for processing data of an image;
a data storage section electrically connected to the processing unit and for storing the data of the image processed by the processing unit; and
a second signal transmitting component electrically connected to the processing unit and for receiving the image;
a portable image capturing electronic device, comprising:
a main body, an accommodating chamber being formed inside the main body and comprising a top portion and a bottom portion opposite to the top portion, the main body comprising a shading portion and a connecting portion, the shading portion comprising a protrusion portion, the protrusion portion protruding toward the connecting portion and away from the bottom portion of the accommodating chamber, the protruding portion comprising four lateral walls and a top wall, the four lateral walls being inclined relative to the top wall and connected to the top wall, a bottom opening being enclosed by the four lateral walls, and a size of the top wall being less than a size of the bottom opening, the top wall and the four lateral walls of the protrusion portion being located inside the connecting portion, and the connecting portion being formed in a one piece structure;
a light transmissive base plate disposed near a bottom of the main body and for pressing against an object;
an image capturing lens assembly disposed on the top wall of the protrusion portion and located at the top portion and facing toward the bottom portion for capturing the image corresponding to the object pressed by the light transmissive base plate;
a light source assembly disposed on the top portion and comprising a plurality of first light sources, the plurality of first light sources being disposed adjacent to the image capturing lens assembly and facing toward the bottom portion for illuminating the object, and the plurality of first light sources being located inside the protruding portion and between the top wall and the bottom opening;
a handheld assembly comprising a handle portion and an actuating button adjacent to the handle portion, the handheld assembly being connected to the connecting portion; and
a first signal transmitting component electrically connected to the actuating button and the image capturing lens assembly and for communicating with the second signal transmitting component so as to transmit the image;
wherein when the actuating button generates a first signal and transmits the first signal to the processing unit via communication between the first signal transmitting component and the second signal transmitting component, the processing unit generates a corresponding second signal to actuate the image capturing lens assembly to capture the image corresponding to the object and the image is transmitted to the processing unit via the communication between the first signal transmitting component and the second signal transmitting component.

18. The image capturing system of claim 17, wherein the handheld assembly further comprises a second light source for presenting a first color when the portable image capturing electronic device and the electronic apparatus are coupled through the first signal transmitting component and the second signal transmitting component and for presenting a second color different from the first color when the portable image capturing electronic device and the electronic apparatus are not coupled.

19. The image capturing system of claim 17, wherein the plurality of first light sources are actuated when the portable image capturing electronic device and the electronic apparatus are coupled through the first signal transmitting component and the second signal transmitting component.

* * * * *